United States Patent Office 3,705,816
Patented Dec. 12, 1972

3,705,816
PIGMENT PREPARATION
Guenther Zwahlen, Dornach, Ernst Reich, Bettingen, and Karl Ewald Schoohf, Dornach, Switzerland, assignors to Ciba-Geigy AG, Basel, Switzerland
No Drawing. Filed June 23, 1970, Ser. No. 49,202
Claims priority, application Switzerland, July 2, 1969, 10,135/69; May 14, 1970, 7,203/70
Int. Cl. C08h 17/02
U.S. Cl. 106—308    7 Claims

ABSTRACT OF THE DISCLOSURE

Preparations comprising a pigment and/or an optical brightener having pigment characteristics and cellulose which is esterified by both an aliphatic or cycloaliphatic carboxylic acid and acid selected from benzoic, phenylacetic and cinnamic acids, which cellulose ester may, if desired, contain free hydroxyl groups, are useful for coloring lacquers and plastic masses.

---

Pigments, that is to say dyestuffs which are insoluble or practically insoluble not only in water but also in various organic solvents, are advantageously used for dyeing a wide variety of substrates in order to prevent subsequent migration or especially bleeding out of the dyestuffs. However, this often involves the difficulty of uniformly distributing a finely divided pigment powder in the substrate to be pigmented. To overcome this difficulty recourse is often made to pigment preparations in which a pigment is distributed in a concentrated form in a suitable carrier. Such a pigment preparation must, of course, satisfy various requirements if it is to fulfill its purpose. Thus, for example, the pigment must be well and uniformly distributed in the preparation and the carrier must be suitable for the envisaged ultimate use, that is to say it must be compatible with the substrate to be coloured and must be capable of easy incorporation therein.

The present invention provides a preparation comprising a pigment and/or an optical brightener having pigment characteristics and cellulose which is esterified by both an aliphatic or cycloaliphatic carboxylic acid and an acid selected from benzoic, phenylacetic and cinnamic acids, which cellulose ester may, if desired, contain free hydroxyl groups. Such a preparation is extremely suitable for pigmenting high-molecular organic compounds, especially thermosetting acrylic resin lacquers.

Suitable pigments for the preparations according to the present invention are, for example, inorganic substances, for example lampblack, metal powders, titanium dioxide, iron-III-hydroxide, chrome oxide green, molybdate orange, ultramarine and especially organic pigments, for example those of the azo, anthraquinone, phthalocyanine, nitro, perinone, perylenetetracarboxylic acid diimide, dioxazine, thioindigo, isoindolinone or quinacridone dyestuff series, and also optical brighteners having pigment characteristics. Mixtures of several pigments or mixtures of pigments with optical brighteners may also be used.

The cellulose derivatives on which the preparations according to this invention are based contain as the residue of an aliphatic carboxylic acid, for example, an acetyl, propionyl, crotonyl or especially a butyryl residue, and as the benzoyl residue, for example, a benzoyl residue substituted by halogen atoms or by alkyl or alkoxy groups, or especially an unsubstituted benzoyl residue. As examples of the cellulose derivatives there may be mentioned: cellulose acetobenzoate, cellulose propiobenzoate, cellulose crotonatebenzoate, cellulose stearatebenzoate, cellulose benzoate-hexahydrobenzoate, cellulose aceto-ortho-chlorobenzoate, cellulose propio-ortho-methoxybenzoate, cellulose propio-ortho-methylbenzoate, cellulose aceto-phenylacetate, cellulose aceto-cinnamate, and especially cellulose benzobutyrate which preferably contains 35 to 45% of butyryl, 15 to 22% of benzoyl and 0.5 to 3.5% of free hydroxyl groups.

The quantity ratio of pigment to cellulose derivative may vary within wide limits, but the pigment proportion is preferably from 20 to 90%. Particularly good results have been obtained with preparations containing 40 to 60% of pigment.

In addition to the cellulose derivatives according to this invention the preparations may contain other cellulose esters, for example cellulose acetobutyrate or cellulose acetopropionate, or other auxiliary materials, for example plasticisers, stabilisers or fillers.

To prepare the pigment preparations the ingredients may be intimately mixed, for example by grinding in the presence of a liquid, advantageously a water-soluble organic solvent, for example methanol, ethanol, isopropanol, or acetone.

Standard ball or roller mills may be used as desired, although it is preferable to use mills in which a charge of glass spheres, porcelain or similar spheres or a charge of hard flints, sand or the like is agitated by a suitable stirrer. All these types of comminution devices have the common feature that the grinding auxiliaries are relatively freely mobile and can perform both rubbing and impact movements.

On completion of the grinding operation the solvent is advantageously removed by evaporation or, when a solvent has been chosen in which the cellulose ester used is soluble, by pouring the ground material into a precipitant, whereupon the dissolved cellulose ester is precipitated onto the pigment and the preparation is subsequently isolated by filtration, washing and drying.

It is especially advantageous to manufacture the preparations according to this invention in a kneader. The processing is preferably carried out at an elevated temperature in the presence of a grinding auxiliary, advantageously an inorganic salt, for example sodium chloride, potassium chloride, sodium sulphate or barium chloride. These salts can be easily washed out with water. It is also advantageous to add an organic solvent, preferably a water-miscible organic solvent, for example ethylene glycol, glycerine, glycol monoethyl ether, methyl ethyl ketone or diacetone alcohol. On completion of the kneading operation the resulting dough is advantageously treated with water to free it from salts and solvents.

When necessary, the resulting pigment preparations can be comminuted by known methods, for example in a mill.

By virtue of the particular solubility and compatibility properties of the carrier substance, the pigment preparations of this invention are especially suitable for pigmenting paints and lacquers, printing inks and fibres spun from a solution. It is also possible to use them to pigment a variety of thermoplastic materials, for example cellulose acetate. From the range of lacquers and paints the following may be mentioned: air-drying and thermosetting acrylic resin lacquers, special types of air-drying alkyd resin lacquers and thermosetting alkyd/melamine resin lacquers, as well as nitro combination, silicone resin and epoxy resin lacquers. From the range of printing inks there may be mentioned, for example, those based on nitrocellulose. The preparations are also suitable for pigmenting casting resins, for example polyester and epoxy resins, as well as polyurethane lacquers and coating and grouting compositions.

The preparations according to this invention are of particular value for the colouring of acrylic resin lacquers. It is known that the pigmentation of thermoplastic and especially thermosetting acrylic resin lacquers involves very great difficulties. Owing to their chemical composition these lacquer resins have a poor pigment acceptance capacity, which is shown by the fact that the individual pigment particles tend to be inadequately covered with the binder. In the applied and dried acrylic resin lacquer films this disadvantage causes an insufficient gloss, poor adhesion and elasticity and a poor stability towards external atmospheric conditions which is often insufficient for high-grade paints, for example motor body lacquers. The intimate incorporation of the pigments into the cellulose derivatives used as the carrier in the manufacture of the preparations according to the invention ensures not only a good distribution of the pigment but also an adequate covering of the individual particles with a binder which is compatible with acrylic lacquers. Moreover, for the use of these preparations, the time-consuming, complicated and costly process of dispersing the pigments in the binder is replaced by a simple stirring operation which within a short period of time provides a perfect dispersion of the pigment preparation in the lacquer solvents.

Acrylic resin lacquers pigmented with the preparations of the invention are distinguished by their excellent gloss, very good adhesion and elasticity and substantially improved stability towards atmospheric conditions and water. They can be applied by the "coil-coating" process. Moreover, with these types of lacquers, the ready tendency of various pigments, for example Phthalocyanine Blue, to flocculate is inhibited by the use of the preparations according to the invention.

The pigment preparations according to the invention are also suitable for the manufacture of coloured spun fibres, for example cellulose acetate fibres, polyacrylonitrile fibres and polyurethane fibres.

The preparations are distinguished by their excellent dispersibility and tinctorial strength, and uniform and pure colourings are obtained in the above-mentioned thermoplastic masses, casting resins, lacquers, printing inks, fibres etc.

Unless otherwise specified, parts and percentages in the following examples are by weight.

EXAMPLE 1

1 part of crude β-copper phthalocyanine, 1 part of cellulose butyrate benzoate, 4 parts of ground sodium chloride and 0.6 part of diacetone alcohol, are kneaded in a kneader for 6 hours at 70° C. The dough is granulated by adding 1 part of water and then ground wet using about 50 to 100 parts of water. The resulting suspension is filtered, washed free of solvent and salt with water, and the resulting filter cake is dried in a vacuum cabinet, yielding a free-flowing powder which can be used, for example, for pigmenting air-drying acrylic resin lacquers, thermosetting acrylic resin lacquers, alkyd/melamine resin lacquers, nitro combination lacquers, ester-soluble nitro lacquers (including printing inks), silicone resin lacquers, epoxy resin lacquers, cellulose-2½-acetate and casting resins.

The cellulose butyrobenzoate used above may be manufactured by the process disclosed in British specification No. 313,408 as follows:

(a) Esterification with benzoic acid 73.2 parts of benzoic acid (100% excess) are mixed with 102.6 parts of chloroacetic anhydride (100% excess), 0.9 part of magnesium perchlorate and 60 parts of monochloroacetic acid and the mixture is stirred for 20 minutes at 55° C., whereupon a clear solution is obtained. Then 51 parts of cellulose Avicel (95.4%) are added and the mixture is stirred for 2½ hours at 65° C., then poured into 1000 parts by volume of methanol, filtered and washed with methanol and dried in a vacuum cabinet at 60 to 65° C.

(b) Esterification with butyric acid

A mixture of 94 parts of n-butyric acid (100% excess), 182 parts of chloroacetic anhydride (100% excess) and 0.75 part of magnesium perchlorate is stirred at 40° C. until a clear solution has formed. Then 63.3 parts of the cellulose benzoate obtained sub (a) are rapidly added and the mixture is stirred for 3 hours at 65° C. The reaction mixture is poured into 1000 parts by volume of methanol and the resulting suspension diluted with 2000 parts by volume of water, filtered, the filter residue is washed with water and dried in a vacuum cabinet at 80° C.

EXAMPLE 2

The following ingredients are kneaded as described in Example 1 for 2 hours at 80° C.:

1 part of polychloro-copper phthalocyanine green
1 part of cellulose butyrobenzoate
2 parts of sodium chloride and
0.5 part of diacetone alcohol.

The resulting dough is broken up by adding 0.6 part of water, granulated and worked up as described in Example 1.

EXAMPLE 3

The following ingredients are kneaded for 6 hours at about 70° C. as described in Example 1:

1 part of the red disazo dyestuff of the formula

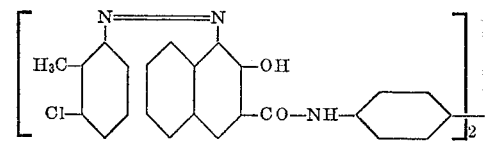

1 part of cellulose butyrobenzoate
4 parts of sodium chloride
0.6 parts of diacetone alcohol.

The resulting dough is broken up by adding 0.9 part of water, granulated and worked up as described in Example 1.

EXAMPLE 4

The following ingredients are kneaded for 6 hours at about 80° C. as described in Example 1:

1 part of Flavanthrone yellow
1 part of cellulose butyrobenzoate
3 parts of sodium chloride and
0.5 part of diacetone alcohol.

The resulting dough is broken up by adding 0.7 part of water, granulated and worked up as described in Example 1.

EXAMPLE 5

The following ingredients are kneaded for 4 hours at about 70° C.:

1 part of 4,4′,7,7′-tetrachlorothioindigo
1 part of cellulose butyrobenzoate
5 parts of sodium chloride and
0.65 part of diacetone alcohol.

The resulting dough is broken up by adding 1 part of water, granulated and worked up as described in Example 1.

EXAMPLE 6

The following ingredients are kneaded for 4 hours at about 50° C.:

1 part of the red pyrrocoline pigment of the formula

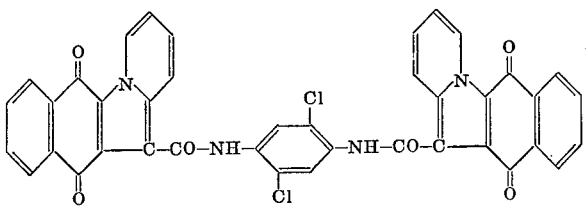

1 part of cellulose butyrobenzoate
4 parts of sodium chloride and
0.8 part of diacetone alcohol.

The resulting dough is broken up by adding 1 part of water, granulated and worked up as described in Example 1.

EXAMPLE 7

The following ingredients are kneaded for 6 hours at about 70° C. as described in Example 1:

1 part of the violet dioxazine pigment of the formula

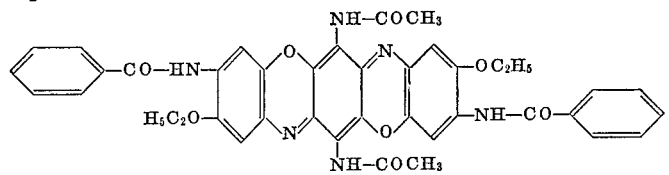

1 part of cellulose butyrobenzoate
4 parts of sodium chloride and
0.6 part of diacetone alcohol.

The resulting dough is broken up by adding 1 part of water, granulated and worked up as described in Example 1.

EXAMPLE 8

The following ingredients are kneaded for 4 hours at about 60° C. as described in Example 1:

1 part of γ-quinacridone red
2 parts of cellulose butyrobenzoate
4 parts of sodium chloride and
0.9 part of diacetone alcohol.

The resulting dough is broken up by adding 1 part of water, granulated and worked up as described in Example 1. The resulting preparation contains 33.3% of pigment.

EXAMPLE 9

The following ingredients are kneaded for 2 hours at about 65° C. as described in Example 1:

3 parts of lampblack Philblack O (Phillips Petroleum)
1 part of cellulose butyrobenzoate
3 parts of sodium chloride and
3.2 parts of diacetone alcohol.

The resulting dough is broken up by adding 1 part of water, granulated and worked up as described in Example 1. The resulting black preparation contains 75% of lampblack.

EXAMPLE 10

The following ingredients are kneaded for 2 hours at about 70° C. as described in Example 1:

1 part of molybdate orange (Mineral Fiery Red SGGS of Messrs. Siegle)
1 part of cellulose butyrobenzoate and
0.3 part of diacetone alcohol.

The resulting dough is broken up by adding 1 part of aqueous sodium chloride solution of 25% strength, granulated and worked up as described in Example 1.

EXAMPLE 11

(Acrylic resin stoving lacquer)

8 parts of the preparation obtained according to Example 1 are stirred into 20 parts of a solvent of the following composition:

50 parts of Solvesso 150
15 parts of butylacetate
5 parts of Exkin II (flow agent)
25 parts of methylisobutylketone and
5 parts of silicone oil (1% in Solvesso 150).

When the ingredients have been finely divided (depending on the type of stirrer in about 15 to 60 minutes) the binders:

48.3 parts of Baycryl L 530 (51% in xylene/butanol 3:1) and
23.7 parts of Maprenal TTX (55% in butanol)

are added. After a short homogenisation operation the lacquer is applied by a known method, for example spraying or dipping or especially for the continuous coating of sheet metal by the "coil-coating" process, and then stoved (for 30 minutes at 130° C.). The resulting blue lacquer coats are distinguished by very good flow, high gloss and excellent distribution of the pigment as well as excellent stability towards atmospheric conditions.

Instead of the preparation obtained in Example 1 the preparation obtained according to any one of Examples 2 to 10 may be used with equally good results.

EXAMPLE 12

(Alkyd/melamine resin stoving lacquer)

8 parts of the pigment preparation obtained in Example 1 are dispersed in 22 parts of the under-mentioned solvent mixture during 35 minutes at room temperature using a disc impeller stirrer rotating at 3000 revolutions per minute.

Solvent mixture:

10 parts of xylene
4 parts of ethyleneglycol monoethyl ether
4 parts of butyl acetate
2 parts of n-butanol
1 part flow agent and
1 part of 1% silicone oil solution in xylene When the mixture has been completely finely distributed, the following binder solutions are stirred in:

23.5 parts of Cardura 30, 80% in xylene (Shell)
25.0 parts of Alkydal F 25, 75% in xylene (Bayer)
21.5 parts of Cibamin H 86, 75% in butanol (CIBA).

After stirring for 15 minutes the lacquer is applied in the usual manner and hardened for 30 minutes at 135° C.

Instead of the preparation obtained in Example 1 the preparation of any one of Examples 2 to 10 may be used with equally good results.

EXAMPLE 13

(Silicone resin lacquer)

8 parts of a pigment preparation obtained according to Example 5 are distributed in 22 parts of a solvent mixture consisting of 10 parts of xylene
8 parts of butyl acetate and
2 parts of cyclohexanone during 35 minutes at room temperature using a disc impeller stirrer rotating at 3000 revolutions per minute.

When the ingredients have been distributed finely stirring is continued and a binder solution consisting of 68.5 parts of silicone resin UD 160 (Bayer), 75% in xylene/butanol 8:2
1 part of polymeric butyltitanate and
0.5 part of lead naphthenate containing 30% of lead is stirred in.

After stirring for 15 minutes the lacquer is applied in the usual manner or by the coil-coating process and hardened for 30 minutes at 200° C.

Instead of the preparation of Example 5 a preparation according to any one of Examples 1 to 4 or 6 to 10 may be used with equally good results.

EXAMPLE 14

(Epoxy resin lacquer)

5.0 parts of the pigment preparation obtained in Example 1 are distributed as described in Example 12 in 23.0 parts of a solvent mixture consisting of:

3.0 parts of n-propanol
6.0 parts of ethyleneglycol ethyl ether acetate
6.0 parts of ethyleneglycol monoethyl ether and
8.0 parts of xylene.

While continuing the stirring, 53.2 parts of binder solution I, consisting of 21.3 parts of Araldite 6097 (CIBA)
14.4 parts of diacetone alcohol
3.2 parts of ortho-dichlorobenzene and
14.3 parts of xylene as well as 18.8 parts of binder solution II, being a solution of 75% of Cibamin H 53 (CIBA) in butanol, are added.

After stirring for 15 minutes, the lacquer is applied in the usual manner and hardened for 30 minutes at 180° C.

Instead of the preparation of Example 1 there may be used a preparation according to any one of Examples 2 to 10 with equally good results.

EXAMPLE 15

(Epoxy casting resin)

A casting resin excellently suitable for pigmenting is obtained by mixing 87.26 parts of Araldite GY–250 (CIBA)
3.64 parts of the preparation of Example 1 and
9.1 parts of curing agent HY–951 (CIBA).

When the mixture is poured into moulds and then cured, mouldings of a uniform blue colouration are obtained.

What we claim is:

1. A dry preparation comprising 20 to 90% by weight of a pigment and/or an optical brightener having pigment characteristics and correspondingly from 80% to 10% of cellulose which is esterified by both an aliphatic or cycloaliphatic carboxylic acid and an acid selected from benzoic, phenylacetic and cinnamic acids, which cellulose ester may, if desired, contain free hydroxyl groups.

2. A preparation as claimed in claim 1, wherein the benzoic acid may be substituted by halogen atoms or by alkyl or alkoxy groups.

3. A preparation as claimed in claim 1, wherein the cellulose ester is a cellulose butyrobenzoate.

4. A preparation as claimed in claim 3, wherein the cellulose butyrobenzoate contains 35 to 45% of butyryl groups, 15 to 22% of benzoyl groups and 0.5 to 3.5% of free hydroxyl groups.

5. A preparation as claimed in claim 1, which comprises 40 to 60% of pigment and 60 to 40% of cellulose butyrobenzoate.

6. A preparation as claimed in claim 1, which also comprises a cellulose acetobutyrate or cellulose acetopropionate.

7. A preparation as claimed in claim 1, wherein the pigment is an organic pigment or an inorganic coloured or white pigment.

References Cited

UNITED STATES PATENTS

| | | | |
|---|---|---|---|
| 3,429,840 | 2/1969 | Lowe et al. | 260—15 |
| 2,649,382 | 8/1953 | Vesce et al. | 106—193 |

JAMES E. POER, Primary Examiner

J. V. HOWARD, Assistant Examiner

U.S. Cl. X.R.

106—193 J, 193 P; 252—301.2 W, 301.3 W